May 24, 1960     E. J. LEUTHOLD     2,937,458
SIMULATED AIRCRAFT CONTROL LOADING APPARATUS
Filed Jan. 16, 1958
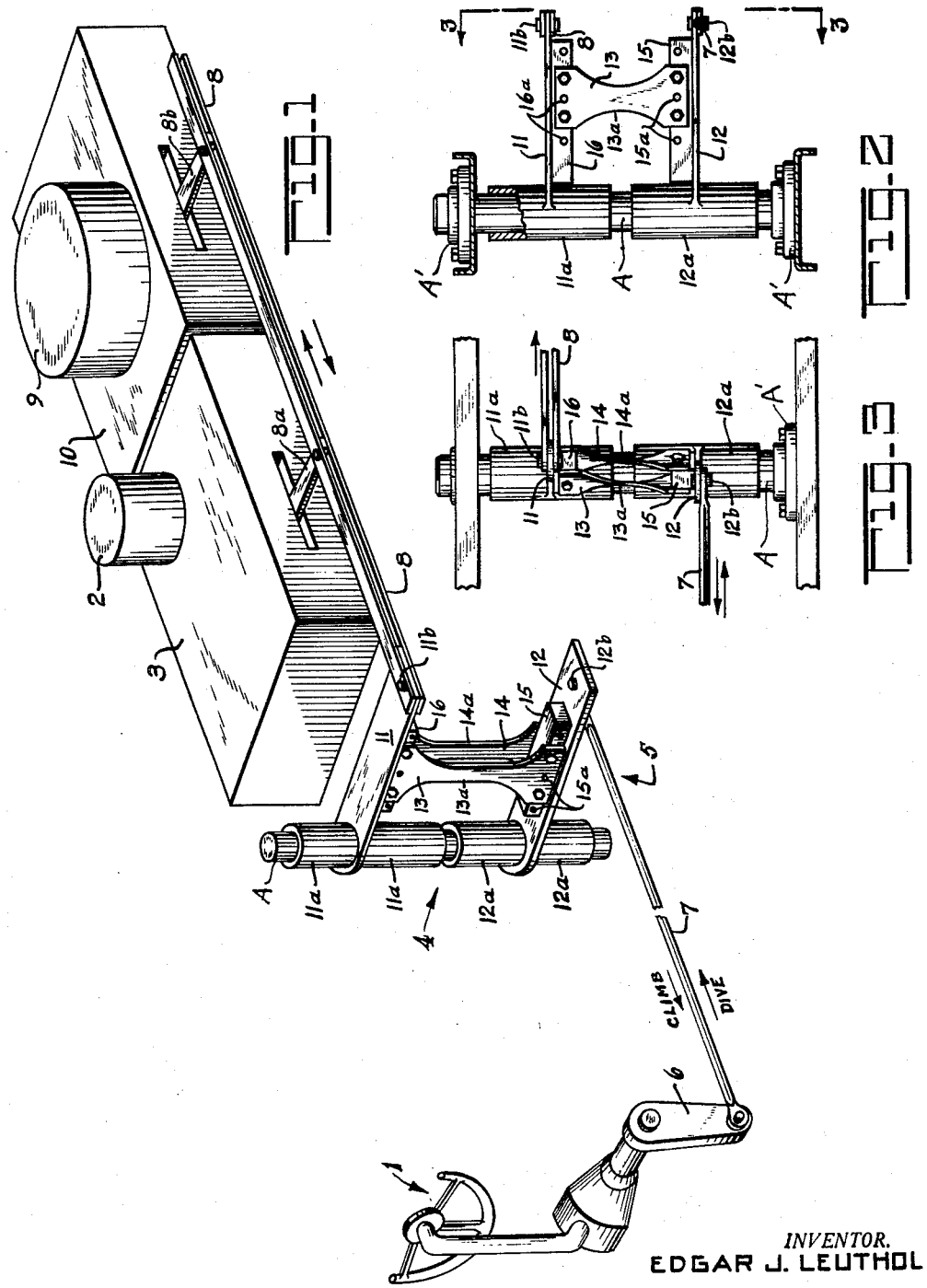
INVENTOR.
EDGAR J. LEUTHOLD
BY
HIS ATTORNEY

United States Patent Office 2,937,458
Patented May 24, 1960

2,937,458
SIMULATED AIRCRAFT CONTROL LOADING APPARATUS

Edgar J. Leuthold, Wood-Ridge, N.J., assignor to Curtiss-Wright Corporation, a corporation of Delaware Filed Jan. 16, 1958, Ser. No. 709,278

3 Claims. (Cl. 35—12)

This invention relates to aircraft training apparatus for the ground training of aircraft personnel, and in particular to apparatus for simulating the operation of the pilot's controls during actuation of aerodynamically loaded aircraft control surfaces, including those of the aileron, elevator and rudder.

The simulation of control loading has assumed a number of different forms according to the prior art, the principal methods involving spring loading and motor loading, the latter method in turn including the use of electric, hydraulic and pneumatic motors. Spring loading, either alone or in combination with a spring-tensioning motor has in general been unrealistic and unsatisfactory, particularly where precise simulation is required. Motor loading, by itself, may be more realistic than spring loading where the motor-loading force is accurately computed; however known devices apply the loading force through a transmission that does not provide for an important effect known as "cable stretch."

In the aircraft, the pilot's controls are separated from the elevator, etc., controls by long steel cables so that when the pilot at high air speeds exerts considerable force to actuate the heavily loaded controls, there is bound to be a certain amount of stretch in the control cables. This stretch is perceptible and is an important factor in the realistic simulation of control loading. Heretofore, this "feel" of cable stretch has been either absent in simulated control loading apparatus for aircraft trainers or so distorted that its training value was practically nil.

A principal object of the present invention therefore is to provide improved control loading apparatus that realistically simulates the feel of cable stretch and that is simple, compact, inexpensive and rugged in construction, and that can be suitably adjusted to match the characteristics of different control systems.

The invention will be more fully set forth in the following description referring to the accompanying drawing, and the features of novelty will be pointed out with particularity in the claims annexed to and forming a part of this specification.

Referring to the drawing, Fig. 1 is a schematic illustration of the invention as applied to a single simulated control of ground-based aircraft training apparatus;

Fig. 2 is an elevational side view illustrating in detail the simulated cable-stretch device of Fig. 1; and Fig. 3 is an elevational end view taken along the line 3—3 of Fig. 2 illustrating angular displacement (exaggerated) of the device under heavy loading.

Referring to Fig. 1, the simulated control loading apparatus comprises essentially a pilot's control 1, in the present instance the elevator control, a control loading motor 2 for opposing movement of the pilot's control with reduction gearing indicated at 3, a device 4 for introducing cable stretch simulation, and a linkage generally indicated at 5, including the device 4, for interconnecting the pilot's control 1 and the loading motor 2. It will be understood that similar equipments are also provided for the aileron and rudder controls.

In the usual operation of a well known form of control loading apparatus prior to the present invention, wherein the pilot's control is mechanically connected directly to the loading motor, the pilot's control is moved either fore or aft to represent dive or climb and the movement is transmitted through a linkage such as the crank 6, transmission rod 7 and links 8 and 8a to the loading motor 2 through its reduction gearing at 3. The motor 2 is energized so as to resist the movement of the pilot's control from neutral by a computed force voltage that is a function of the simulated air speed and the degree of control displacement. This voltage is variable in sense and magnitude so as to vary the motor torque accordingly. A portion of the force computer is represented by a potentiometer 9 that is also connected through its reduction gearing at 10 to the links 8b and 8 so that the potentiometer is positioned according to the control movement. A force computer of the character described for deriving a loading force voltage for in turn energizing the motor 2 is disclosed in Patent No. 2,808,659 granted October 8, 1957 to R. C. Dehmel; also this patent discloses a motor control system suitable for use with the present invention.

According to the invention the simulated cable stretch device 4 is directly interposed in the main linkage 5 so as in the present instance to interconnect the rod 7 and the link 8. Furthermore, the device is so arranged in the linkage that it can be adjusted to provide for different response characteristics without affecting the basic mechanical advantage of the linkage system. The device 4 in the disclosed embodiment of the invention comprises a pair of independently operable arms 11 and 12 each having a sleeve (11a and 12a respectively) that is mounted on a common bearing rod A for independent movement with respect to a common axis. The sleeves 11a and 12a are mounted so as to "float" along the longitudinal axis of the bearing rod A during relative angular displacement of the arms 11 and 12, and the rod A is rigidly mounted at its opposite end in fixed supports A'.

The transmission rod 7 is pivotally connected as indicated at 12b to the free end of arm 12 and the link 8 is similarly pivoted at 11b to the free end of arm 11. Intermediate the ends of the arms, and interconnecting the arms, is resilient structure that in the present instance is subjected to torsional stress according to relative angular movement of the arms 11 and 12. When the arms are in exact alignment indicating little or no control loading, the device is under minimum stress and there is no deformation. When however the control loading is materially increased as in coming out of a dive for example, wherein the control 1 is pulled back and the pilot's force tends to rotate the arm 12 clockwise and the opposing loading motor tends to rotate the arm 11 counterclockwise, a limited amount of relative angular movement occurs between the arms 11 and 12. This is schematically indicated by Fig. 3, the angle being exaggerated for purposes of illustration. During such control loading the resilient structure is flexed and subjected primarily to torsional stress and also to tension and compression stresses by reason of the specific configuration and contour of the resilient structure.

In a specific embodiment of the invention that has proved satisfactory in practice, the resilient structure comprises a pair of parallel, spaced metal plates or strips 13 and 14 that are suitably secured to the arms 11 and 12, as by bolting to a pair of spacer blocks 15 and 16 welded to the arms 11 and 12 respectively. The plates 13 and 14 as shown may be of spring steel and are reduced in cross section or "necked" at their intermediate portions 13a and 14a respectively, the precise contour of the reduced portion being empirically determined according to the characteristic torque-deflection response of the aircraft control to be simulated. The torsion plates 13 and 14 may be either similar in form or dissimilar according to the characteristic response to be simulated. This arrangement has been found to be equivalent to a damped spring system, thus simulating more realistically the stretch of a long steel cable.

For the purpose of adapting the simulated cable stretch device to different simulators, or for representing later design changes in the aircraft simulated, the torsion plates 13 and 14 can be adjustably positioned along the moment arms 11 and 12 as clearly indicated by Fig. 2 without of course changing the ratio of the lengths of the moment arms, and hence the mechanical advantage of the main linkage system. In other words, the mechanical advantage which is the ratio of the distance the applied force at 12b moves to the distance which the resisting force at 11b moves remains substantially constant. The adjustment may be made by any suitable means, such as bolting the plates at varying positions 15a and 16a along the spacer blocks 15 and 16 respectively, thereby varying the strain on the plates for a given loading.

In operation as the pilot operates the control 1 against the opposing force exerted by the loading motor to simulate climb for example, the arms 11 and 12 are urged in opposing directions as indicated in Fig. 3 so that the plates 13 and 14 are twisted and subjected to torsional stress. This action is coincident with floating adjustment of the sleeves 11a and 12a along the rod A depending on the degree of relative angular displacement of the arms. As compared with the prior use of springs, which tend to introduce "sloppiness" in the simulated loading, the present device is sufficiently realistic and precise so as in practice to match the torque-deflection characteristic of the aircraft control to be simulated. This has not been accomplished heretofore.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus, means for simulating the cable stretch incident to operation of aerodynamically loaded controls of aircraft, said apparatus having simulated aircraft control means corresponding to the aileron, elevator or rudder control of aircraft and a loading motor individual to the control means mechanically connected thereto for holding the loading force thereon, the connecting means between each control and its loading motor comprising a mechanical linkage and a plurality of longitudinally spaced resilient metal strips subject to torsional stress under loading and directly interposed in said linkage, said metal strips interconnecting a pair of lever arms of said linkage subject respectively to the pilot's control force and the opposing force of the loading motor, and being adjustably secured at different positions to each lever arm intermediate the pivot and force application points thereof for simulating stretch characteristics of different cables, so that the mechanical advantage of the linkage is constant coincident with lateral adjustment of said strips.

2. Apparatus as specified in claim 1 wherein the metal strips are flat and variable in cross-sectional area according to the stretch characteristic of the cable simulated and are secured at their opposite ends to the linkage moment arms respectively.

3. Apparatus as specified in claim 1 wherein each lever arm is connected to a sleeve or the like and the sleeves are mounted for rotation and for limted floating axial movement on fixed bearing means whereby relative angular displacement of the lever arms occurs coincident with torsional flexing of said metal strips.

References Cited in the file of this patent

UNITED STATES PATENTS

| | | |
|---|---|---|
| 2,615,710 | Lyman | Oct. 28, 1952 |
| 2,694,319 | Johnson | Nov. 16, 1954 |
| 2,695,145 | Lear et al. | Nov. 23, 1954 |
| 2,804,698 | Grandmont | Sept. 3, 1957 |